(12) United States Patent
Sudschajew

(10) Patent No.: US 10,724,457 B2
(45) Date of Patent: Jul. 28, 2020

(54) REGENERATION OF A PARTICULATE FILTER OR FOUR-WAY CATALYTIC CONVERTER IN AN EXHAUST SYSTEM OF AN INTERNAL COMBUSTION ENGINE

(71) Applicant: Volkswagen Aktiengesellschaft, Wolfsburg (DE)

(72) Inventor: David Sudschajew, Abbesbüttel (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 15/983,720

(22) Filed: May 18, 2018

(65) Prior Publication Data

US 2018/0334976 A1 Nov. 22, 2018

(30) Foreign Application Priority Data

May 18, 2017 (DE) .................. 10 2017 208 438

(51) Int. Cl.
*F02D 41/02* (2006.01)
*F02D 41/04* (2006.01)
(Continued)

(52) U.S. Cl.
CPC ........... *F02D 41/027* (2013.01); *F01N 3/021* (2013.01); *F01N 3/023* (2013.01); *F01N 3/10* (2013.01);
(Continued)

(58) Field of Classification Search
CPC combination set(s) only.
See application file for complete search history.

(56) References Cited

U.S. PATENT DOCUMENTS

2003/0230060 A1* 12/2003 Yahata ............... B01D 46/0063
55/282.3
2010/0089035 A1 4/2010 Kamiya et al.
(Continued)

FOREIGN PATENT DOCUMENTS

DE 101 30 633 A1 1/2003
DE 10 2010 046 899 A1 3/2011
(Continued)

OTHER PUBLICATIONS

Pudenz, Katrin. "Volkswagen shows start-stop 2.0 and freewheel engine-off" (*Volkswagen Zeigt Start-Stopp 2.0 Und Freilauf-Motor-Aus*), Dec. 10, 2014, www.springerprofessional.de/automobil-+-motoren/volkswagen-zeigt-start-stopp-2-0-und-freilauf-motor-aus/6585236.
(Continued)

*Primary Examiner* — Binh Q Tran
(74) *Attorney, Agent, or Firm* — Pearl Cohen Zedek Latzer Baratz LLP

(57) ABSTRACT

In a method for the regeneration of a particulate filter or of a four-way catalytic converter in an exhaust system of an internal combustion engine, an increase in the nitrogen oxide emissions during the regeneration of the particulate filter or of the four-way catalytic converter can be prevented or at least reduced. A particulate filter or a four-way catalytic converter is arranged in the exhaust system of an internal combustion engine. The fuel injection and the ignition are switched off in response to a request for the internal combustion engine to be turned off. Due to mass inertia, the internal combustion engine transitions from the switch-off rotational speed to a standstill whereby, during this phase, oxygen-rich air is conveyed into the exhaust passage. A partial regeneration of the filter or of the catalytic converter takes place with the oxygen contained in this fresh air, whereby the particulate mass discharged from the filter or (Continued)

the catalytic converter is determined by means of a computational model.

12 Claims, 2 Drawing Sheets

(51) Int. Cl.
    *F01N 9/00*     (2006.01)
    *F01N 3/023*     (2006.01)
    *F01N 3/021*     (2006.01)
    *F01N 3/10*     (2006.01)
    *F02N 11/08*     (2006.01)

(52) U.S. Cl.
    CPC .......... *F01N 9/002* (2013.01); *F02D 41/029* (2013.01); *F02D 41/042* (2013.01); *F02N 11/0833* (2013.01); *F01N 2900/0412* (2013.01); *F01N 2900/08* (2013.01); *F02D 2200/101* (2013.01)

(56) References Cited

U.S. PATENT DOCUMENTS

| | | | |
|---|---|---|---|
| 2011/0072793 A1 | 3/2011 | Bidner et al. | |
| 2013/0269323 A1* | 10/2013 | Oguri | B01D 46/0063 60/276 |
| 2013/0340424 A1* | 12/2013 | Van Nieuwstadt | F01N 3/0238 60/600 |
| 2015/0053190 A1* | 2/2015 | Hubbard | F01N 3/0253 123/679 |
| 2015/0369180 A1* | 12/2015 | Leone | F02N 11/0803 123/52.1 |
| 2016/0201534 A1 | 7/2016 | Lambert et al. | |
| 2018/0094556 A1* | 4/2018 | Kurtz | F02D 41/029 |

FOREIGN PATENT DOCUMENTS

| | | |
|---|---|---|
| DE | 10 2012 202 188 A1 | 8/2013 |
| DE | 10 2012 022 153 A1 | 5/2014 |
| DE | 10 2013 008 426 A1 | 11/2014 |
| DE | 10 2013 220 899 A1 | 4/2015 |
| DE | 10 2015 208 631 A1 | 11/2016 |
| DE | 10 2015 211 570 A1 | 12/2016 |
| WO | WO 2015/169 958 A1 | 11/2015 |

OTHER PUBLICATIONS

Search report for German Patent Application No. 10 2017 208 438.3, dated Apr. 26, 2018.
Search report for European Patent Application No. 18164849.4, dated Jun. 18, 2018.

\* cited by examiner

REGENERATION OF A PARTICULATE FILTER OR FOUR-WAY CATALYTIC CONVERTER IN AN EXHAUST SYSTEM OF AN INTERNAL COMBUSTION ENGINE

CROSS-REFERENCE TO RELATED APPLICATIONS

This application claims priority from German Patent Application No. 10 2017 208 438.3, filed May 18, 2017, which is hereby incorporated by reference.

FIELD OF THE INVENTION

The invention relates to a device as well as to a method for the regeneration of a particulate filter or of a four-way catalytic converter in an exhaust system of an internal combustion engine.

BACKGROUND OF THE INVENTION

Since legislation on exhaust-gas emissions is becoming increasingly stringent, the automotive industry is faced with high requirements, which are being met by appropriate measures aimed at reducing the raw emissions of engines and by an appropriate after-treatment of the exhaust gas. The introduction of European emission standard Euro 6 for gasoline engines stipulates a limit value for the particulate number which, in many cases, makes it necessary to employ a gasoline particulate filter. During driving, such a gasoline particulate filter is loaded with soot. This gasoline particulate filter has to be regenerated continuously or periodically so as to prevent the exhaust-gas counter-pressure from rising excessively. In order to use oxygen to carry out a thermal oxidation of the soot captured in the gasoline particulate filter, it is necessary to have a sufficiently high temperature in conjunction with the concurrent presence of oxygen in the exhaust system of the gasoline engine. Since modern gasoline engines are normally operated without an oxygen excess at a stoichiometric air-fuel ratio ($\lambda=1$), additional measures are necessary for this purpose. Possible measures include, for instance, raising the temperature by shifting the advance angle, temporarily shifting towards a lean mixture in the gasoline engine, blowing secondary air into the exhaust system or a combination of these measures. So far, preference is given to shifting the advance angle in the "late" direction in combination with shifting towards a lean mixture in the gasoline engine since this method makes do without the need for additional components and can deliver a sufficient amount of oxygen in most operating points of the gasoline engine. Efforts are also aimed at bringing the catalytic converters located in the exhaust passage of the internal combustion engine up to the operating temperature as quickly as possible after a cold start so that a high conversion rate for harmful exhaust-gas components can be reached as quickly as possible. However, a shift towards a lean mixture in the internal combustion engine during the regeneration of the particulate filter can cause a significant rise in the nitrogen oxide emissions ($NO_x$ emissions) during the regeneration of the particulate filter since, at an over-stoichiometric air-fuel ratio, the exhaust gas no longer contains components such as carbon monoxide (CO) or unburned hydrocarbons (HC) which allow a catalytic reduction of the nitrogen oxide emissions to form molecular nitrogen on the three-way catalytic converter.

German patent application DE 10 2013 220 899 A1 discloses a method for the regeneration of a particulate filter in the exhaust system of an internal combustion engine, whereby the temperature of the exhaust gas of the internal combustion engine is adapted by an appropriate lambda regulation in order to provide the temperature needed for the regeneration of the particulate filter and in order to ensure the concurrent presence of residual oxygen in the exhaust gas of the internal combustion engine. A drawback of such a method, however, is that a shift towards a lean mixture in the internal combustion engine leads to an increase in the nitrogen oxide emissions in the exhaust gas during the regeneration of the particulate filter.

International patent application WO 2015/169958 A1 discloses an externally ignited internal combustion engine whose exhaust system contains a particulate filter, whereby, in order to regenerate the particulate filter, a multi-stage process is carried so that any detrimental impact on the driving comfort during the regeneration of the particulate filter is kept to a minimum. Towards this end, a passive regeneration of the particulate filter during an overrunning phase of the internal combustion engine as the "mildest" measure is combined with appropriate active measures for the regeneration, whereby, in a multi-stage process, the specific measures selected are the ones involving the least impact on the driving comfort or on the performance of the internal combustion engine. A drawback of such a method, however, is that here as well, the active measures cause the air-fuel ratio of the internal combustion engine to shift towards a lean mixture, which is associated with an increase in the nitrogen oxide emissions.

German patent application DE 10 2012 022 153 A1 discloses a method for the regeneration of a particulate filter in the exhaust passage of a gasoline engine, whereby, in a first step, the temperature of the particulate filter or the temperature of an exhaust-gas mass flow through the particulate filter is determined and, when the particulate filter has reached a regeneration temperature, the soot captured in the particulate filter is oxidized in that the oxygen fraction in the exhaust gas is raised above the level of a stoichiometric exhaust gas.

German patent application DE 10 2010 046 899 A1 discloses the regeneration of a particulate filter in the exhaust passage of an internal combustion engine, whereby the regeneration takes place while the internal combustion engine is being switched off. In this process, the air-fuel ratio is shifted towards a "lean" mixture directly before the ignition is switched off when the particulate filter has reached a certain load and the temperature of the particulate filter is high enough to allow a partial regeneration of the particulate filter when the internal combustion engine is being switched off. The proposed method, however, only allows the regeneration of a small portion of the soot captured in the particulate filter since the time period during which oxygen-rich air is being conveyed into the exhaust passage after the injection and the ignition have been turned off is relatively short.

Moreover, exhaust after-treatment systems are known in which the temperature of the particulate filter is raised by shifting the advance angle in the direction of "late" until the particulate filter has reached its regeneration temperature and the amount of oxygen needed for the oxidation of the soot captured in the particulate filter is fed to the exhaust passage via a secondary air system. For this purpose, however, a secondary air system is always necessary, which markedly increases the costs for the internal combustion engine.

SUMMARY OF THE INVENTION

Before this backdrop, the invention is based on the objective of allowing the particulate filter to be regenerated in a way that is at least essentially emission-neutral in an exhaust system without a secondary air system and that overcomes the drawbacks known from the state of the art.

This objective is achieved according to the invention by means of a method for the after-treatment of the exhaust gas of an internal combustion engine in whose exhaust system a particulate filter or a four-way catalytic converter is arranged, said method encompassing the following steps:

the internal combustion engine is run in a normal mode of operation with a stoichiometric air-fuel ratio, whereby the soot particles formed during the combustion are captured in the exhaust system by the particulate filter or by the four-way catalytic converter, the particle entrainment into the particulate filter or into the four-way catalytic converter is determined by means of a computational model, a request for the internal combustion engine to be switched off is transmitted to a control unit of the internal combustion engine, the fuel injection into the combustion chambers of the internal combustion engine is switched off, whereby the fuel injection is switched off when the rotational speed of the internal combustion engine is above a threshold value, the particulate filter or the four-way catalytic converter is regenerated by means of the residual oxygen conveyed into the exhaust system when the engine is winding down after the fuel injection has been switched off, whereby the soot discharge from the particulate filter or from the four-way catalytic converter is determined by means of a computational model.

With such a method, the regeneration of the particulate filter, especially a regeneration in several partial steps, can be carried out without a significant rise in the emissions, especially in the nitrogen oxide emissions, during the regeneration. Thanks to the method according to the invention, there is no need for a shift towards a lean mixture in the internal combustion engine. Therefore, a three-way catalytic converter can effectuate the cleaning of the exhaust gas and the conversion of the noxious substances during the entire operation of the engine, and it is not necessary to undertake additional exhaust after-treatment measures during the regeneration of the particulate filter. When the fuel injection is switched off, the internal combustion engine continues to run due to mass inertia so that, between the time when the fuel injection is switched off and the time when the engine comes to a standstill, oxygen-rich air is conveyed into the exhaust passage and it can oxidize the soot particles captured in the particulate filter.

The features cited in the dependent claims translate into advantageous improvements and refinements of the method for the after-treatment of the exhaust gas of an internal combustion engine cited in the independent claim.

In a preferred embodiment of the invention, it is provided that, before the engine is switched off, the rotational speed of the internal combustion engine is raised to a rotational speed above the threshold value if the internal combustion engine is idling at the point in time of the request for it to be switched off. The increase in the rotational speed of the internal combustion engine before it is switched off and especially before the fuel injection into the combustion chambers of the internal combustion engine is switched off makes it possible to increase the air volume that is available for the regeneration of the particulate filter. In this context, in turn, the inertia of the internal combustion engine is utilized to carry out a partial regeneration of the particulate filter during the stopping procedure. Assuming a partial or complete loading of the particulate filter before there is a need for a regeneration of the particulate filter or of the four-way catalytic converter, then the proposed method makes it possible to discharge a portion ranging from 1 mg to 100 mg from the particulate filter every time the engine stops. Accordingly, this calls for several partial regeneration steps, but these can be implemented without any additional actions and thus are not noticeable to the driver of the motor vehicle.

In this context, the threshold value for the rotational speed is above the usual idling speed of the internal combustion engine. The increase in the rotational speed before the switch-off prolongs the phase during which the engine is winding down, as a result of which more oxygen is conveyed into the exhaust system. Consequently, a larger portion of the soot particles can be oxidized. Therefore, fewer regeneration steps are necessary until the particulate filter has been completely regenerated.

In this context, it is particularly preferred if the threshold value for the rotational speed is above 900 rpm. Since the engines of motor vehicles normally have an idling speed ranging from 650 rpm to 900 rpm, such a threshold value can ensure that a sufficient quantity of oxygen gets into the exhaust passage of the internal combustion engine.

In another preferred embodiment of the method, it is provided for the fuel injection into the combustion chambers of the internal combustion engine to only be switched off once the temperature of the particulate filter or of the four-way catalytic converter or the temperature of the exhaust gas is above a threshold temperature. The use of the start-stop system for an active regeneration is employed continuously. The engine also goes into the stop phase, in other words, the injection is off, even when the filter is not being regenerated. This is done with an eye towards the driving behavior. The vehicle has to behave in the same manner throughout. In order to regenerate the particulate filter, that is to say, in order to oxidize the soot particles captured in the particulate filter or in the four-way catalytic converter, not only does oxygen have to be present, but at the same time, a minimum temperature is necessary in order to allow soot oxidation to take place. If the particulate filter or the four-way catalytic converter is at a temperature level below this minimum temperature, then regeneration of the particulate filter is not possible by means of the proposed method. For this reason, in these operating states, the method according to the invention is not initiated and the internal combustion engine is turned off, especially without increasing the rotational speed.

In this context, the threshold temperature preferably is within the range from 550° C. to 750° C. In this temperature range, the soot captured in the particulate filter can be oxidized without the risk of thermal damage to the particulate filter.

According to an improvement of the proposed method, it is provided that a throttle valve installed in the intake duct of the internal combustion engine is completely opened in response to a request for the internal combustion engine to be switched off. The air volume fed into the exhaust passage and thus the amount of oxygen available for the oxidation of the soot captured in the particulate filter or in the four-way catalytic converter can be increased by opening the throttle valve. As a result, a larger portion of the soot particles can be oxidized. Therefore, fewer regeneration steps are necessary until the particulate filter has been completely regenerated. At the same time, the oxidation can be diminished by varying the position of the throttle valve in order to prevent the filter from overheating. This can also optionally be employed, depending on a given project.

In a preferred embodiment of the method, it is provided for the switch-off signal of the internal combustion engine to be triggered by a start-stop system of the internal combustion engine. In the case of a start-stop system, the internal combustion engine is switched off considerably more frequently, for example, when the vehicle stops at a traffic light, than in case of an internal combustion engine without a start-stop system. Consequently, the number of regeneration phases is increased, as a result of which the particle mass discharged from the particulate filter can be increased. With a frequent start-stop process, for example, in the case of stop-and-go traffic, an essentially complete regeneration of the particulate filter can be achieved within a relatively short period of time.

In another improvement of the method, it is provided that the method is started when the load of the particulate filter or of the four-way catalytic converter is above a threshold value for the load of the particulate filter or of the four-way catalytic converter. Even though in principle the method can be carried out independently of the load state of the particulate filter or of the four-way catalytic converter, the initiation of the method involving an increase in the rotational speed of the internal combustion engine before the switch-off procedure is particularly advantageous when the particulate filter has reached a first threshold value for the load of the particulate filter or of the four-way catalytic converter.

According to another advantageous embodiment of the method, it is provided for the temperature of the exhaust gas to be raised when it is recognized that a request for the internal combustion engine to be switched off is imminent. As a result, the particulate filter or the four-way catalytic converter can be heated up to a regeneration temperature so that the oxygen introduced into the exhaust passage on the basis of the proposed method is already at a sufficient temperature for the oxidation of the soot. As an alternative, the temperature can also be raised in order to accelerate the burn-off of soot on the particulate filter and to discharge more soot from the particulate filter or from the four-way catalytic converter within the limited time window between the time when the fuel injection is switched off and the time when the internal combustion engine comes to a standstill.

According to the invention, the objective is achieved by means of a device for the after-treatment of the exhaust gas of an internal combustion engine having an exhaust system in which a particulate filter or a four-way catalytic converter is arranged, and having a control unit with a machine-readable program code, whereby, when the program code is executed, the control unit is configured to carry out a method according to the invention. With such an exhaust after-treatment device, it is possible to achieve a particularly efficient cleaning of the exhaust gas, even during operating phases—especially during the regeneration of the particulate filter—in which the emissions can increase in the case of exhaust systems known from the state of the art.

In a preferred embodiment of the invention, it is provided for the particulate filter or the four-way catalytic converter to be arranged near the engine as the first component of the exhaust after-treatment system. Since the particulate filter or the four-way catalytic converter is arranged near the engine, the regeneration temperature of at least 550° C. can be reached relatively easily. As a result, the fresh air introduced into the exhaust passage while the internal combustion engine is being switched off can be efficiently utilized for the oxidation of the soot captured in the particulate filter or in the four-way catalytic converter. If a $NO_x$ storage catalytic converter has been additionally provided in the exhaust passage of the internal combustion engine, then it is particularly advantageous for the particulate filter or for the four-way catalytic converter to be arranged as the first component of the exhaust after-treatment system, and for the $NO_x$ storage catalytic converter to be arranged downstream from the particulate filter or from the four-way catalytic converter. Since the maximum storage capacity of $NO_x$ storage catalytic converters is within a temperature range of approximately 250° C. to 480° C., and consequently below the regeneration temperature of the particulate filter or of the four-way catalytic converter, it is advantageous for the hot exhaust gas to first flow through the particulate filter or through the four-way catalytic converter and then through the $NO_x$ storage catalytic converter in order to attain an optimal after-treatment of the exhaust gas and the lowest possible level of emissions.

In this context, it is preferable for the internal combustion engine to be associated with a start-stop system with which the internal combustion engine is switched off, for example, when the vehicle stops at a traffic light, and is then restarted when the driver indicates that the vehicle should drive. Internal combustion engines with start-stop systems are switched off considerably more frequently, so that the proposed method can be utilized considerably more frequently. This allows a timely regeneration of the particulate filter or of the four-way catalytic converter.

Unless otherwise indicated in a specific case, the various embodiments of the invention cited in this application can be advantageously combined with each other.

BRIEF DESCRIPTION OF THE DRAWINGS

The invention will be explained below on the basis of embodiments with reference to the accompanying drawings. The following is shown.

DETAILED DESCRIPTION OF THE INVENTION

Figure 1:
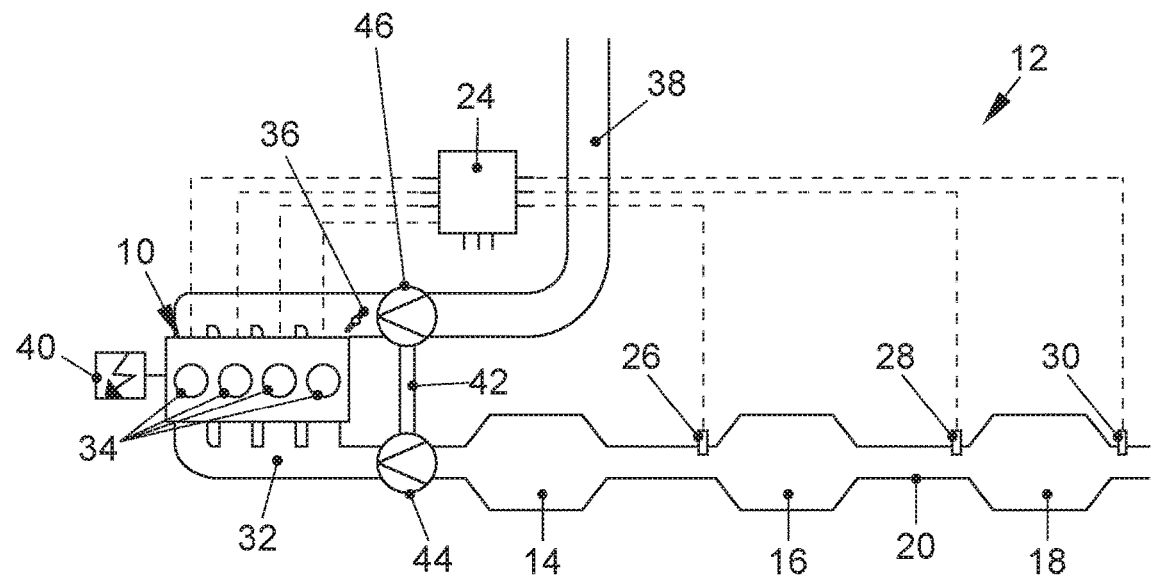
FIG. 1 is an internal combustion engine having an intake system and an exhaust system with which the emissions during the regeneration of the particulate filter can be reduced within the scope of a method according to the invention.

FIG. 1 shows a schematic view of an internal combustion engine 10 having an exhaust system 12 connected to an outlet 32 of the internal combustion engine 10. A particulate filter 14 is arranged in the exhaust system 12 near the engine in the flow direction of an exhaust gas of the internal combustion engine 10 through the exhaust system 12. In this context, the term "near the engine" refers to a position in the exhaust system corresponding to a distance of less than 80 cm, preferably less than 50 cm, that the exhaust gas has to travel from the outlet 32 of the internal combustion engine 10. Downstream from the particulate filter 14, especially in the undercarriage of a motor vehicle, there is a three-way catalytic converter 16 and, further downstream, a $NO_x$ storage catalytic converter 18, which are connected to each other by an exhaust passage 20 of the exhaust system 12. The amount of fuel injected into the combustion chambers 34 of the internal combustion engine 10 and thus the fuel-air ratio $\lambda_E$ of the internal combustion engine 10 can be regulated by means of a control unit 24. Several lambda sensors 26, 28, 30 are arranged in the exhaust passage 20 in order to regulate the fuel-air ratio $\lambda_E$ of the internal combustion engine 10. An exhaust-gas turbocharger 42 whose turbine 44 is powered by an exhaust-gas stream of the internal combustion engine 10 is provided downstream from the outlet 32 of the internal combustion engine 10 and upstream from the particulate filter 14. The internal combustion engine 10 also comprises an intake system having an intake duct 38 in which there is a throttle valve 36 that serves to control the amount of air fed to the combustion chambers 34 of the internal combustion engine 10. Moreover, the intake system has a compressor 46 that is powered by the turbine 44 of the exhaust-gas turbocharger 42 and that compresses the fresh air fed to the internal combustion engine 10. The internal combustion engine 10 has a start-stop system 40 with which the internal combustion engine 10 is switched off when the vehicle comes to a standstill and which is only restarted in response to a start signal, for instance, the release of the depressed brake pedal.

Figure 2:
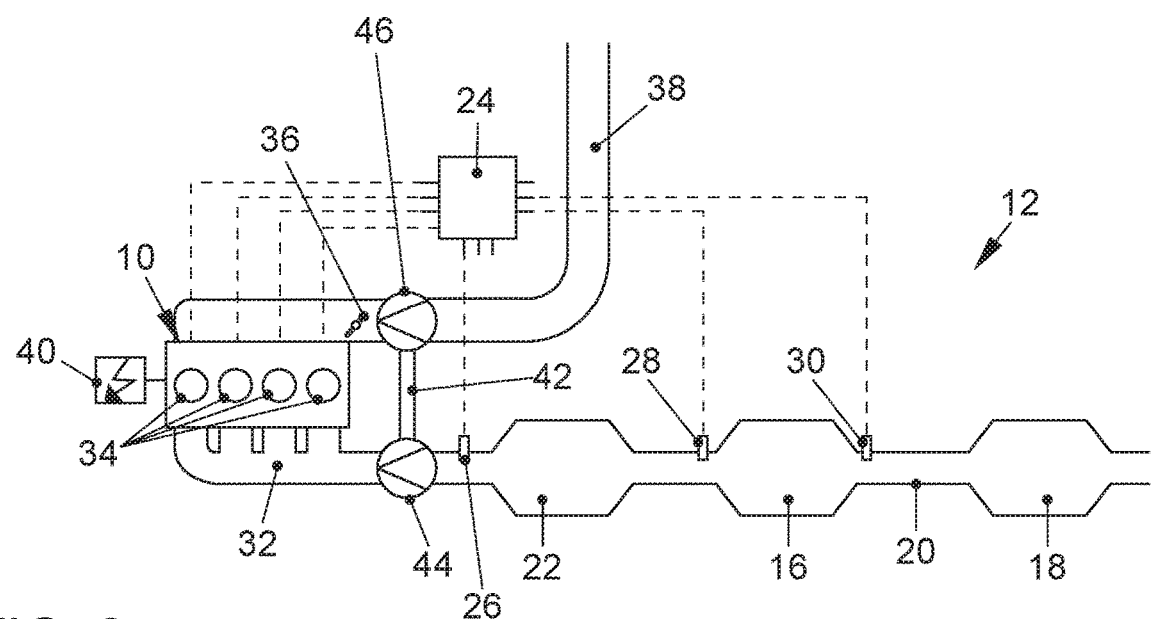
FIG. 2 is an alternative embodiment of the exhaust system according to the invention in which, instead of a particulate filter, a four-way catalytic converter is arranged near the engine.

With a structure essentially identical to the one depicted in FIG. 1, the (uncoated) particulate filter 14 shown in FIG. 2 is replaced with a particulate filter having a three-way catalytically active coating, a so-called four-way catalytic converter 22. Here, the four-way catalytic converter 22 combines the functions of a particulate filter and of a three-way catalytic converter. Owing to the arrangement of the additional three-way catalytic converter 16 in the undercarriage of the motor vehicle, the four-way catalytic converter can be configured so as to be relatively small in order to allow a quick warm-up to the operating temperature following a cold start of the internal combustion engine 10. As an alternative, thanks to the four-way catalytic converter 22, it is also possible to dispense with an additional three-way catalytic converter 16, especially a three-way catalytic converter 16 in the undercarriage of the motor vehicle.

During the operation of the internal combustion engine 10, the particles that are formed in the exhaust gas of the internal combustion engine 10 during the combustion can be captured by the particulate filter 14 or by the four-way catalytic converter 22. In this process, the particulate filter 14 or the four-way catalytic converter 22 is loaded with soot in the known manner. This loading can cause effects such as elevated fuel consumption, power loss and misfiring if the exhaust-gas counter-pressure rises above a given threshold value $S_L$ because of the loading of the particulate filter 14 or of the four-way catalytic converter 22. As a result, the particulate filter 14 or the four-way catalytic converter 22 has to be regenerated cyclically or as a function of the loading. In order to regenerate the particulate filter 14 or the four-way catalytic converter 22, it is not only necessary for a regeneration temperature to be reached but also for residual oxygen to be present in the exhaust system so that the soot particles captured in the particulate filter 14 or in the four-way catalytic converter 22 can be oxidized. Due to the over-stoichiometric operation of the internal combustion engine 10, the three-way catalytic converter 16 and the four-way catalytic converter 22 lose their conversion capacity for nitrogen oxides since there is no longer any reducing agent present to reduce the nitrogen oxide to elementary nitrogen.

In order to prevent over-stoichiometric operation of the internal combustion engine 10 as well as the increase in the nitrogen oxide emissions associated with this, it is provided for the oxygen needed to regenerate the particulate filter 14 or the four-way catalytic converter 22 to be conveyed into the exhaust system in that, when the internal combustion engine 10 is being switched off, first of all, the fuel injection into the combustion chambers 34 of the internal combustion engine 10 is switched off and then the residual rotational speed of the internal combustion engine 10 until it comes to a standstill is used to convey oxygen-rich fresh air into the exhaust system 12.

Figure 3:
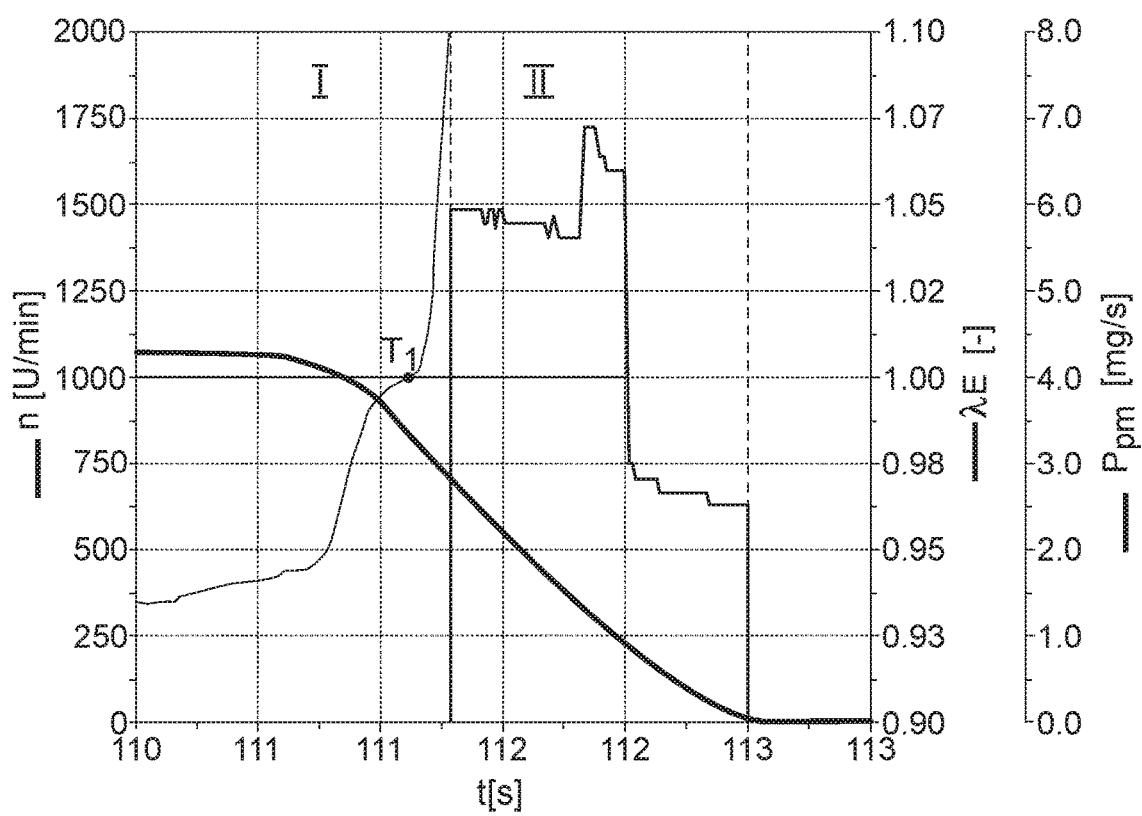
FIG. 3 is a diagram showing the sequence of the inventive method for the after-treatment of the exhaust gas of an internal combustion engine.

FIG. 3 shows an engine diagram that explains a method according to the invention for the after-treatment of the exhaust gas of the internal combustion engine 10. In this context, the rotational speed n of the internal combustion engine is plotted over the time t. In a first phase I of the method, a check is carried out as to whether the rotational speed n of the internal combustion engine 10 is above a threshold value $S_1$ for the rotational speed n. If the rotational speed n is below this threshold value $S_1$, especially at the usual idling speed $n_I$, first of all, the rotational speed n of the internal combustion engine is increased to a rotational speed n above the threshold value $S_1$, especially to a rotational speed of at least 1100 rpm, especially preferably at least 1200 rpm. If the rotational speed n of the internal combustion engine 10 is above this threshold value $S_1$, then no additional measures are undertaken. In a second method step, the injection of fuel into the combustion chambers 34 of the internal combustion engine 10 is switched off at a point in time $T_1$ and the ignition is turned off.

As a result, the rotational speed n of the internal combustion engine 10 drops from an operating rotational speed to 0 so that the internal combustion engine 10 comes to a stop. During the switch-off procedure, the inertia of the internal combustion engine until it comes to a standstill conveys fresh air into the exhaust passage 20. In this process, an excess of oxygen $\lambda \gg 1$ is briefly established in the exhaust system 12 during a second phase II, so that the soot captured in the particulate filter 14 or in the four-way catalytic converter 22 is oxidized and is then discharged in the form of carbon dioxide ($CO_2$) from the particulate filter 14 or from the four-way catalytic converter 22. The soot continues to be discharged for as long as the conditions needed for oxidation of the soot are present. In this context, FIG. 3 shows the particle mass $P_{pm}$ discharged from the particulate filter 14 or from the four-way catalytic converter 22 plotted over the time t. If the internal combustion engine 10 comes to a stop, then fresh air is no longer conveyed into the exhaust passage 20, so that the regeneration of the particulate filter 14 or of the four-way catalytic converter 22 comes to a halt. In this manner, the proposed method also offers protection against an uncontrolled burn-off of soot on the particulate filter 14 or on the four-way catalytic converter 22, since the excess of oxygen for the oxidation of the soot is always available only for a very limited period of time amounting to just a few seconds. If the internal combustion engine 10 is restarted after it has been at a standstill, then the particulate filter 14 or the four-way catalytic converter 22 is once again loaded with soot particles, whereby the entrainment of soot into the particulate filter 14 or into the four-way catalytic converter 22 is ascertained by means of a computational model.

LIST OF REFERENCE NUMERALS 10 internal combustion engine
12 exhaust system
14 particulate filter 16 three-way catalytic converter
18 $NO_x$ storage catalytic converter
20 exhaust passage
22 four-way catalytic converter
24 control unit
26 first lambda sensor
28 second lambda sensor
30 third lambda sensor
32 outlet
34 combustion chamber
36 throttle valve
38 intake duct
40 start-stop system
42 exhaust-gas turbocharger
44 turbine
46 compressor
n rotational speed of the internal combustion engine
$n_A$ switch-off rotational speed
$n_I$ usual idling speed
$P_{pm}$ particle mass discharged from the particulate filter
$S_1$ threshold value
$S_T$ threshold temperature
$S_L$ threshold value for the load of the particulate filter
$T_{EG}$ temperature of the exhaust gas
rpm rotations per minute
$\lambda_E$ fuel-air ratio of the internal combustion engine

The invention claimed is:

1. A method for the after-treatment of the exhaust gas of an internal combustion engine in whose exhaust system a particulate filter or a four-way catalytic converter is arranged, said method encompassing a control unit of the internal combustion engine performing the following steps:
running the internal combustion engine in a normal mode of operation with a stoichiometric air-fuel ratio, whereby the soot particles formed during the combustion are captured in the exhaust system by the particulate filter or by the four-way catalytic converter,
determining the particle entrainment into the particulate filter or into the four-way catalytic converter by means of a computational model,
receiving a request for the internal combustion engine to be switched off,
if the internal combustion engine is idling at a point in time of the request for the internal combustion engine to be switched off, increasing residual oxygen available for regenerating the particulate filter by, before switching off the fuel injection into the combustion chambers of the internal combustion engine, increasing a rotational speed of the internal combustion engine to be above a threshold value,
regenerating the particulate filter or the four-way catalytic converter by means of the residual oxygen conveyed into the exhaust system when the internal combustion engine is winding down after the fuel injection has been switched off, and
determining the soot discharge from the particulate filter or from the four-way catalytic converter by means of the computational model.

2. The method for the after-treatment of the exhaust gas according to claim 1, wherein the threshold value for the rotational speed is above the usual idling speed of the internal combustion engine.

3. The method for the after-treatment of the exhaust gas according to claim 2, wherein the threshold value is within the range from 1100 rpm to 1800 rpm.

4. The method for the after-treatment of the exhaust gas according to claim 1, wherein the fuel injection into the combustion chambers of the internal combustion engine is only switched off once the temperature of the particulate filter or of the four-way catalytic converter or the temperature of the exhaust gas is above a threshold temperature.

5. The method for the after-treatment of the exhaust gas according to claim 4, wherein the threshold temperature is within the range from 550° C. to 750° C.

6. The method for the after-treatment of the exhaust gas according to claim 1, wherein a throttle valve installed in the intake duct of the internal combustion engine is completely opened in response to a request for the internal combustion engine to be switched off.

7. The method for the after-treatment of the exhaust gas according to claim 1, wherein the switch-off signal of the internal combustion engine is triggered by a start-stop system of the internal combustion engine.

8. The method for the after-treatment of the exhaust gas according to claim 1, wherein the method is started when the load of the particulate filter or of the four-way catalytic converter is above a threshold load value for the load of the particulate filter or of the four-way catalytic converter.

9. The method for the after-treatment of the exhaust gas according to claim 1, wherein the temperature of the exhaust gas is raised when it is recognized that a request for the internal combustion engine to be switched off is imminent.

10. A device for the after-treatment of the exhaust gas of an internal combustion engine having an exhaust system in which a particulate filter or a four-way catalytic converter is arranged, comprising a control unit with a machine-readable program code, whereby, when the program code is executed, the control unit is configured to:
run the internal combustion engine in a normal mode of operation with a stoichiometric air-fuel ratio, whereby the soot particles formed during the combustion are captured in the exhaust system by the particulate filter or by the four-way catalytic converter,
determine the particle entrainment into the particulate filter or into the four-way catalytic converter by means of a computational model,
receive a request for the internal combustion engine to be switched off,
if the internal combustion engine is idling at a point in time of the request for the internal combustion engine to be switched off, increase residual oxygen available for regenerating the particulate filter by, before switching off the fuel injection into the combustion chambers of the internal combustion engine, increasing a rotational speed of the internal combustion engine to be above a threshold value,
regenerate the particulate filter or the four-way catalytic converter by means of the residual oxygen conveyed into the exhaust system when the internal combustion engine is winding down after the fuel injection has been switched off, and
determine the soot discharge from the particulate filter or from the four-way catalytic converter by means of the computational model.

11. The device for the after-treatment of the exhaust gas according to claim 10, wherein the particulate filter or the four-way catalytic converter is arranged near the engine as the first component of the exhaust after-treatment system.

12. The device for the after-treatment of the exhaust gas according to claim 10, wherein the internal combustion engine is associated with a start-stop system.

* * * * *